(12) United States Patent
Dahinten (10) Patent No.: US 11,841,019 B2
(45) Date of Patent: Dec. 12, 2023

(54) ROTARY PISTON COMPRESSOR AND SYSTEM FOR TEMPERATURE CONDITIONING WITH ROTARY PISTON COMPRESSOR

(71) Applicant: BorgWarner Inc., Auburn Hills, MI (US)

(72) Inventor: Frank Dahinten, Neunkirchen (DE)

(73) Assignee: BorgWarner Inc., Auburn Hills, MI (US)

( * ) Notice: Subject to any disclaimer, the term of this patent is extended or adjusted under 35 U.S.C. 154(b) by 221 days.

(21) Appl. No.: 17/196,175

(22) Filed: Mar. 9, 2021

(65) Prior Publication Data
US 2021/0285441 A1 Sep. 16, 2021

(30) Foreign Application Priority Data
Mar. 11, 2020 (DE) .......................... 102020106685.6

(51) Int. Cl.
*F04C 2/22* (2006.01)
*B60H 1/32* (2006.01)
*F02B 53/00* (2006.01)

(52) U.S. Cl.
CPC ............. *F04C 2/22* (2013.01); *B60H 1/3223* (2013.01); *B60H 2001/3297* (2013.01); *F02B 2053/005* (2013.01); *F04C 2240/30* (2013.01); *F04C 2250/20* (2013.01)

(58) Field of Classification Search
CPC .... F04C 2/22; B60H 1/3223; F02B 2053/005; F02G 1/043
See application file for complete search history.

(56) References Cited

U.S. PATENT DOCUMENTS 3,762,842 A * 10/1973 George, Jr. ............... F04C 2/22
418/61.2
3,800,526 A 4/1974 Wahnschaffe et al.
(Continued)

FOREIGN PATENT DOCUMENTS

DE 2015949 A1 10/1971
DE 2021513 A1 11/1971
(Continued)

OTHER PUBLICATIONS

English translation of WO-2015003818 by PE2E Aug. 24, 2022.*
(Continued)

*Primary Examiner* — Deming Wan
(74) *Attorney, Agent, or Firm* — Howard & Howard Attorneys PLLC (57) ABSTRACT

A rotary piston compressor (1) for a system for temperature conditioning comprises a rotor (19) mounted in a housing (21), wherein the rotary piston compressor (1) is designed in such a way that the rotor (19) rotates in a first direction in a first operating state and rotates in a second direction opposite to the first direction in a second operating state, and wherein, in the first operating state, a first compressor connection (3) is designed to supply a heat transfer medium (17), and a second compressor connection (5) is designed to discharge the compressed heat transfer medium (17), and wherein, in the second operating state, the second compressor connection (5) is designed to supply the heat transfer medium (17), and the first compressor connection (3) is designed to discharge the compressed heat transfer medium (17).

12 Claims, 6 Drawing Sheets

(56) References Cited

U.S. PATENT DOCUMENTS

| | | | | |
|---|---|---|---|---|
| 4,707,996 A | * | 11/1987 | Vobach | F25B 25/02 |
| | | | | 62/502 |
| 6,109,040 A | | 8/2000 | Ellison, Jr. et al. | |
| 6,352,063 B1 | | 3/2002 | Weslake-Hill | |
| 2009/0044557 A1 | * | 2/2009 | Weber | F25B 13/00 |
| | | | | 62/277 |

FOREIGN PATENT DOCUMENTS

| | | | |
|---|---|---|---|
| DE | 7414071 U | 12/1975 | |
| DE | 3000145 A1 | 7/1981 | |
| DE | 4010206 A1 | 10/1991 | |
| DE | 4129772 A1 | 10/1992 | |
| DE | 4425429 A1 | 1/1996 | |
| DE | 69914738 T2 | 1/2005 | |
| DE | 102015205533 A1 | 9/2016 | |
| RO | 127542 * | 6/2012 | F01C 1/22 |
| WO | WO-2015003818 A2 * | 1/2015 | F01C 1/22 |

OTHER PUBLICATIONS

English translation of RO127542 by PE2E Mar. 29, 2023.*
English language abstract not found for DE 20 15 949 A1; however, see English language equivalent U.S. Pat. No. 3,800,526. Original document extracted from espacenet.com database on Mar. 18, 2021, 6 pages.
Machine-Assisted English translation for DE 20 21 513 A1 extracted from the espacenet.com database on Mar. 18, 2021, 6 pages.
Machine-Assisted English translation for DE 74 14 071 U extracted from the espacenet.com database on Mar. 18, 2021, 8 pages.
English language abstract and machine-assisted English translation for DE 30 00 145 A1 extracted from espacenet.com database on Mar. 18, 2021, 14 pages.
English language abstract and machine-assisted English translation for DE 40 10 206 A1 extracted from espacenet.com database on Mar. 18, 2021, 7 pages.
English language abstract and machine-assisted English translation for DE 41 29 772 A1 extracted from espacenet.com database on Mar. 18, 2021, 12 pages.
English language abstract and machine-assisted English translation for DE 44 25 429 A1 extracted from espacenet.com database on Mar. 18, 2021, 7 pages.
English language abstract for DE 69 914 738 T2 A1 extracted from espacenet.com database on Mar. 18, 2021, 2 pages.
Machine-assisted English language abstract and machine-assisted English translation for DE 10 2015 205 533 A1 extracted from espacenet.com database on Mar. 18, 2021, 15 pages.

* cited by examiner

Fig. 11

ROTARY PISTON COMPRESSOR AND SYSTEM FOR TEMPERATURE CONDITIONING WITH ROTARY PISTON COMPRESSOR

CROSS-REFERENCE TO RELATED APPLICATIONS

This application claims priority pursuant to 35 U.S.C. 119(a) of German Patent Application No. 102020106685.6, filed Mar. 11, 2020, which application is incorporated herein by reference in its entirety.

FIELD OF THE INVENTION

The invention relates to a rotary piston compressor and a system for temperature conditioning, in particular for temperature conditioning of a passenger compartment, having such a rotary piston compressor. Such a system is particularly suitable for electric and hybrid vehicles.

BACKGROUND

A system for temperature conditioning for a vehicle regulates the temperature of a passenger compartment such that it is brought to and maintained at a desired temperature, which is also referred to as "conditioning". This enables the passenger compartment to be cool when the ambient temperature is hot and heated when the ambient temperature is cold. For this purpose, the system for temperature conditioning operates as a refrigerating machine or as a heat pump. A refrigerating machine for cooling the passenger compartment is also referred to as an air conditioning system. In a broader understanding of the term "air conditioning", however, it can be understood not only as space air cooling, but also as a system to bring and maintain the air of a space at a desired temperature, that is, to "condition" it.

In a heat pump, thermal energy from the surroundings is transferred as useful heat to the passenger compartment to be heated at a higher temperature than the ambient temperature. The heating of the passenger compartment takes place by a heat transfer medium in a circuit with a compressor and a pressure reducer. When the heat transfer medium is compressed, not only its pressure but also its temperature increases. When the heat transfer medium is expanded by means of the pressure reducer, not only is the pressure of the heat transfer medium reduced, but also its temperature. The compressed and heated heat transfer medium on the outlet side of the compressor is used to heat the passenger compartment and cools down in the process. Subsequent expansion of the heat transfer medium in the pressure reducer cools it further, but it warms up again in the surroundings before it is fed to the compressor and the circuit closes.

The refrigerating machine or air conditioning, which can cool the passenger compartment below ambient temperature, works on a similar principle. The refrigeration machine transports heat energy from the passenger compartment to be cooled to the warmer surroundings via the compressor. However, compressing the heat transfer medium causes an increase in pressure and temperature. However, the heat transfer medium cools down again in the surroundings. Expansion of the heat transfer medium in the pressure reducer causes the pressure and temperature to drop, such that the heat transfer medium can then cool the passenger compartment, wherein it warms up before it is fed to the compressor and the circuit closes.

Heat absorption and heat dissipation of the heat transfer medium, both in the interior and in the surroundings, takes place by heat exchangers suitably placed in the vehicle, which are arranged inside the passenger compartment or outside the passenger compartment.

Electric and hybrid vehicles require an electrically driven system for temperature conditioning, since a belt-driven system is not suitable for temperature conditioning due to the vehicle's electric drive. In electric and hybrid vehicles, the temperature conditioning system usually only uses an electrically driven spiral compressor, also referred to as a scroll compressor, to compress the heat transfer medium, the operation of which is already detrimental to the vehicle range. To avoid further range restriction, additional electrically driven compressors are undesirable in the temperature conditioning system. Since the heating process and cooling process differ in that the compressed heat transfer medium is first fed into the passenger compartment or into the surroundings, it is desirable to change the direction of flow of the heat transfer medium in the system circuit in order to switch between heating and cooling. However, this is not possible with a scroll compressor with a predefined flow direction, such that the flow direction in the temperature conditioning system has to be changed by a complex interconnection of several valves and additional couplings. In a conventional temperature conditioning system, at least three heat exchangers, eight to ten valves and seven connecting hoses are required.

U.S. Pat. No. 6,109,040 describes a power-heating engine and a heat engine having two Wankel rotary pistons, each operated in a housing, which work according to the Stirling cycle.

SUMMARY OF THE INVENTION

The object is to reduce the effort in the system for temperature conditioning, in particular with regard to the compressor.

The object is solved by a rotary piston compressor and the system for temperature conditioning according to the ancillary claims.

The rotary piston compressor for the system for temperature conditioning comprises a rotor mounted in a housing. The rotary piston compressor is configured such that the rotor rotates in a first direction in a first operating state and rotates in a second direction opposite to the first direction in a second operating state. In the first operating state, a first compressor connection is configured to supply a heat transfer medium, and a second compressor connection is configured to discharge the compressed heat transfer medium. In the second operating state, the second compressor connection is configured to supply the heat transfer medium, and the first compressor connection is configured to discharge the compressed heat transfer medium.

The rotary piston compressor is configured as a symmetrical system in which the rotor compresses the heat transfer medium in both directions of rotation. The rotary piston compressor can be driven by the vehicle's electric motor. The drive should be able to take place bidirectionally in order to switch the direction of rotation of the rotor. This turns the compressor connection on the input side into the compressor connection on the output side and vice versa. When using the rotary piston compressor in an air conditioning system, the flow direction of the heat transfer medium can easily be reversed by reversing the rotary rotation direction. In terms of performance, there is no disadvantage with the rotary piston compressor compared to a scroll compressor.

The rotary piston compressor is designed to compress the heat transfer medium, the temperature of which increases as a result. The heat transfer medium is a fluid, i.e. liquid or gaseous. The heat transfer medium is a medium which transports both heat and cold in the temperature conditioning system.

In one embodiment, in the first operating state, with rotation of the rotor, a chamber defined by the housing and the rotor and adjacent to the first compressor connection is deformed with rotation of the rotor in such a way that its volume is reduced and it is adjacent to the second compressor connection. The heat transfer medium flows into the chamber through the first compressor connection. The reduction in volume of the chamber causes the compression of the heat transfer medium, which is discharged at the second compressor connection at a higher pressure. In the second operating state, the chamber defined by the housing and the rotor and adjacent to the second compressor connection is deformed with rotation of the rotor in such a way that its volume is reduced and it is adjacent to the first compressor connection. In the second operating state, the heat transfer medium flows through the second compressor connection into the chamber, which is reduced by the rotor rotation, and thereby compresses and heats the heat transfer medium. The compressed heat transfer medium is then discharged at the first compressor connection.

In one embodiment of the rotary piston compressor, the profile of the rotor is defined by a trochoid, in particular an epitrochoid, and a housing interior, in which the rotor rotates, has a contour corresponding to the outer envelope of the trochoid. In the case of a rotor designed in such a way and a housing interior corresponding thereto, the chambers in the housing interior defined by the rotor and the housing change their size and position with the rotation of the rotor, which enables compression of the heat transfer medium and its transport from the inlet-side to the outlet-side compressor connection.

The rotary piston compressor can be designed as a Wankel compressor, in which the rotor has an arcuate triangular profile. The shape of the housing interior and the rotor corresponds to that of a Wankel engine. The performance of the Wankel compressor is comparable to that of a scroll compressor. However, the flow characteristics of the Wankel compressor allow a larger volume flow and can be designed for very high pressure with interstage intercooling.

In one embodiment, a valve is provided at the first compressor connection and/or at the second compressor connection, which is designed, for example, as a check valve or supports the compression process by opening and closing the valve in coordination with the rotor rotation.

The rotary piston compressor can additionally have a third compressor connection and a fourth compressor connection. This rotary piston compressor is also configured to expand the fluid transfer medium, which is associated with its cooling. In the first operating state, the fourth compressor connection is designed to supply the heat transfer medium, and the third compressor connection is designed to discharge the expanded heat transfer medium. In the second operating state, the reverse is true: the third compressor connection is designed to supply the heat transfer medium, and the fourth compressor connection is designed to discharge the expanded heat transfer medium. Such a dual-function rotary piston compressor is a compressor pressure reducer unit.

During expansion, in the first operating state, with rotation of the rotor, a further chamber defined by the housing and the rotor, which is adjacent to the first compressor connection, is deformed with the rotation of the rotor such that its volume increases and it is adjacent to the third compressor connection. In the second operating condition, the further chamber defined by the housing and the rotor, which is adjacent to the third compressor connection, is deformed with rotation of the rotor such that its volume increases and it is adjacent to the fourth compressor connection.

As the rotor rotates, the chambers defined by the rotor and housing in the housing interior change their size and position with the rotation of the rotor, which, as the chamber enlarges, enables the pressure of the heat transfer medium to be reduced and to be transported from the compressor connection on the inlet side to the compressor connection on the outlet side. The enlargement of the chamber causes a reduction in the pressure of the heat transfer medium contained therein and an associated cooling, such that the rotary piston compressor also acts as a pressure reducer.

Also in this embodiment, a valve can be provided at the third compressor connection and/or the fourth compressor connection to serve as a check valve or to support the expansion.

A system for temperature conditioning having one of the rotary piston compressor embodiments described above further comprises a pressure reducer. The pressure reducer is designed to reduce a pressure of the heat transfer medium flowing through it and cause expansion thereof. A first heat exchanger is coupled between the first compressor connection and a first pressure reducer connection. A second heat exchanger is coupled between the second compressor connection and a second pressure reducing connection.

The system for temperature conditioning can be used in an electric or hybrid vehicle. The direction of flow of the heat transfer medium through the system is achieved in a simple manner by switching the direction of rotation of the rotor in the rotary piston compressor. As a result, it can be operated both as a heat machine and as a refrigeration machine. The system is less complex and has fewer components than a conventional temperature conditioning system, as it requires only two heat exchangers and four hoses for coupling. Additional valves or couplings in the system to change the flow direction are not required. Compared to a conventional system with three heat exchangers, it has one less heat exchanger. This is accompanied by a cost saving. Also, the electric or hybrid vehicle having such a system for temperature conditioning has a greater range than one having a conventional system.

In the vehicle, the first heat exchanger can be located to give off heat or to cool a passenger compartment. The second heat exchanger can be located to give off heat or to absorb heat from the surroundings beyond the passenger compartment. In the first operating condition, the first heat exchanger is operated as an evaporator to cool the passenger compartment and the second heat exchanger is operated as a condenser to discharge heat into the surroundings. In the second operating state, the first heat exchanger is operated as a condenser for heating the passenger compartment and the second heat exchanger is operated as an evaporator.

The pressure reducer is designed to reduce the pressure of the heat transfer medium flowing from the first pressure reducer connection to the second pressure reducer connection and cause expansion thereof, and to reduce the pressure of the heat transfer medium flowing from the second pressure reducer connection to the first pressure reducer connection and cause expansion thereof. In other words, the pressure reducer causes the heat transfer medium to expand and thus cool down, regardless of the direction of flow.

In one embodiment, the pressure reducer is designed as an expansion valve which is a separate component from the rotary piston compressor.

In an alternative embodiment, the pressure reducer is comprised in the rotary piston compressor. The rotary piston compressor is suitable for simultaneous compression and expansion. A separate pressure reducer can be dispensed with, which reduces costs. The first pressure reducer connection corresponds to the third compressor connection. The second pressure reducer connection corresponds to the fourth compression connection.

Overall, the use of the rotary piston compressor in the system for temperature conditioning of a vehicle offers many advantages, as has been described above. The rotary piston compressor, as a simple and inexpensive, yet powerful compressor, can even form an approach for the redesign of a corresponding heat engine.

BRIEF DESCRIPTION OF THE DRAWINGS

In the following, some exemplary embodiments are explained in more detail on the basis of the drawing.

DETAILED DESCRIPTION

In the figures, identical or functionally identical features are provided with the same reference numerals.

Figure 1:
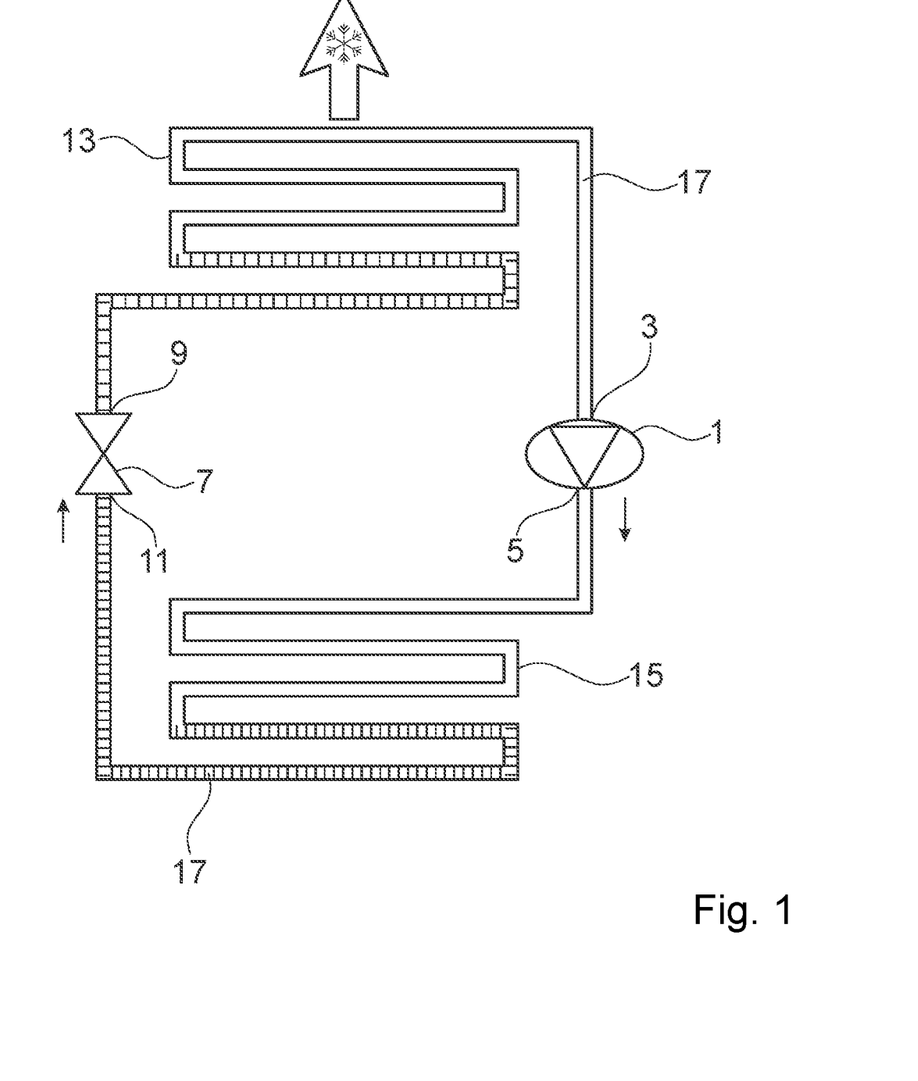
FIG. 1 schematically shows an exemplary embodiment of a system for temperature conditioning in a first operating state.

FIG. 1 schematically shows an exemplary embodiment of a system for temperature conditioning, in particular for an electric or hybrid vehicle. The system for temperature conditioning is operated in a first operating state for cooling a passenger compartment.

The system comprises a rotary piston compressor 1 having a first compressor connection 3 and a second compressor connection 3, and a pressure reducer 7 having a first pressure reducer connection 9 and a second pressure reducer connection 11. A first heat exchanger 13 is coupled between the first compressor connection 3 and the first pressure reducer connection 9. A second heat exchanger 15 is coupled between the second compressor connection 5 and the second pressure reducer connection 11. The coupling can occur through hoses. A heat transfer medium 17, which is a fluid, circulates in this circuit. The heat transfer medium 17 transports thermal energy, that is, both heat and cold, through the system for temperature conditioning. One exemplary embodiment of a heat transfer medium 17 vaporises when heated and re-liquifies when cooled.

The rotary piston compressor 1 is a machine designed to compress the fluid heat transfer medium 17 by means of mechanical work, such that it has a higher pressure and a higher temperature on the output side. The heat transfer medium 17 is preferably gaseous. The rotary piston compressor 1 can be operated bidirectionally. In a first operating state, the heat transfer medium 17 supplied at the first compressor connection 3 is provided at the second compressor connection 5 with higher pressure and higher temperature. In the second operating state, the heat transfer medium 17 supplied at the second compressor connection 5 is provided at the first compressor connection 3 with higher pressure and higher temperature.

The bidirectional pressure reducer 7 is an expansion component for a fluid. The bidirectional pressure reducer 7 is suitable for reducing a pressure of the heat transfer medium 17 flowing though, which is in particular fluid. Due to the expansion, the heat transfer medium 17 expands and cools both when it flows from the first to the second pressure reducing connection 9, 11, and when it flows from the second to the first pressure reducing connection 11, 9.

One exemplary embodiment of a bidirectional pressure reducer 17 is an expansion valve as a separate component from the rotary piston compressor 1. The expansion valve is a component which can have a throttle on the pressure side, such as a cross-section reduction, to expand the heat transfer medium 17 flowing through it.

The first and second heat exchangers 13, 15 are suitable for transferring the thermal energy of the heat transfer medium 17 flowing therethrough to another material flow. During cooling, the inflowing liquid heat transfer medium 17 can evaporate in the heat exchangers 13, 15. During heating, the inflowing gaseous heat transfer medium 17 can liquefy.

The first heat exchanger 13 serves to cool and heat the passenger compartment and is suitably positioned in the vehicle. The second heat exchanger 15 gives off heat into the surroundings when cooling the passenger compartment, and absorbs heat from the surroundings when heating the passenger compartment. In this context, the surroundings are understood to be the vehicle surroundings beyond the passenger compartment. The second heat exchanger 15 is suitably positioned in the vehicle, for example in a radiator region.

In the first operating state, also illustrated in FIG. 1, the passenger compartment is cooled by the system for temperature conditioning. In the first operating state, the rotary piston compressor 1 compresses the heat transfer medium 17 drawn in at the first compressor connection 3 and provides it in compressed form at the second compressor connection 5. After compression, the heat transfer medium 17, which is still in gaseous form, has a higher pressure and a higher temperature. The compressed heat transfer medium 17 flows through the second heat exchanger 15, wherein it is cooled by the ambient temperature and liquefies again in the process. It should be noted that the heat transfer medium 17 has a higher temperature than the ambient temperature on the outlet side of the rotary piston compressor 1. Then, the heat transfer medium 2 flows from the second to the first pressure reducer connection 11, 9 through the pressure reducer 7, wherein it expands and cools down. The cooled heat transfer medium 17 then flows through the first heat exchanger 13 to cool the passenger compartment. In doing so, it evaporates and is then returned to the first compressor connection 3. The rotary piston compressor 1 compresses the heat transfer medium 17, and the circuit described for cooling the passenger compartment has closed.

Figure 2:
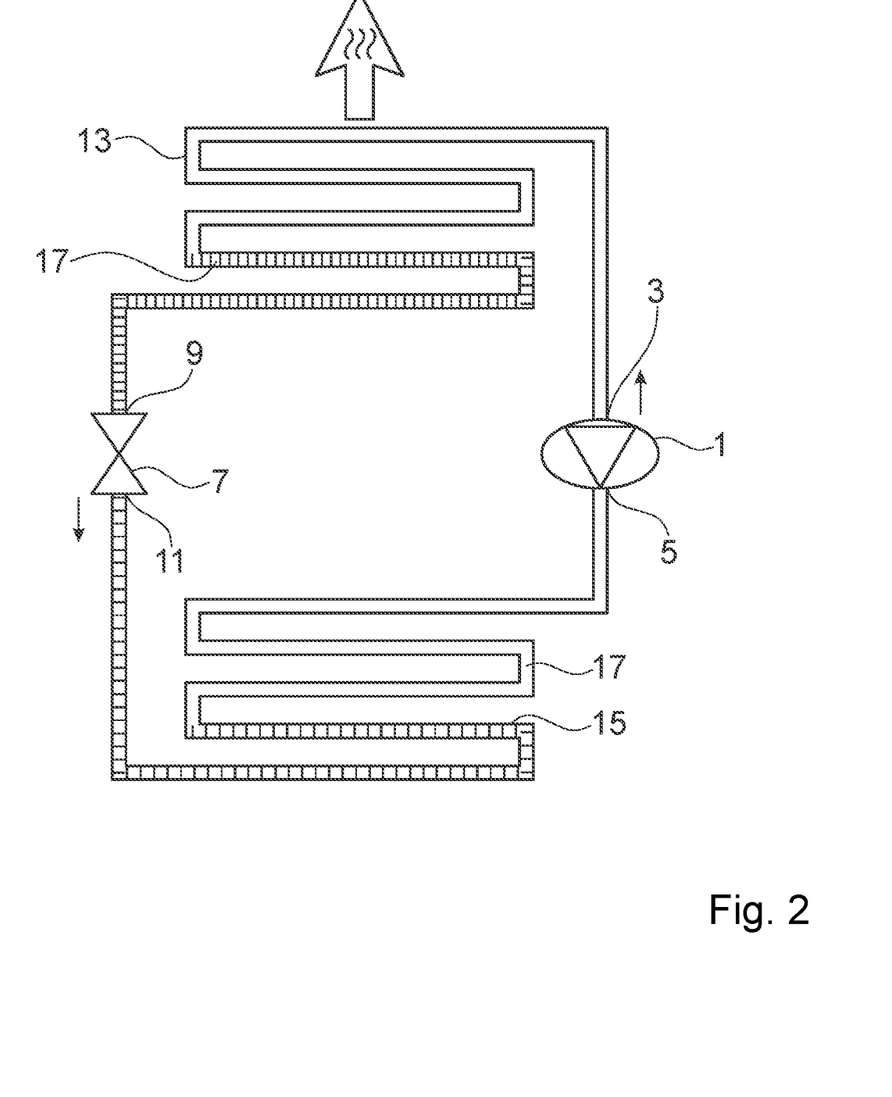
FIG. 2 schematically shows the exemplary embodiment of the system for temperature conditioning in a second operating state.

FIG. 2 schematically shows the system for temperature conditioning described above, which is operated in a second operating state in which the passenger compartment is heated.

In the second operating state, the rotary piston compressor 1 compresses the gaseous heat transfer medium 17 drawn in at the second compressor connection 5 and makes it available at the first compressor connection 3 at a higher pressure and temperature. The heat transfer medium 17 flows through the first heat exchanger 13 to heat the passenger compartment. In doing so, it cools down and liquefies. In the pressure reducer 7 through which the heat transfer medium 17 flows from the first to the second pressure reducer connection 9, 11, the heat transfer medium 17 expands and cools. As it flows through the second heat exchanger 15, the cooled heat transfer medium 17 is heated by the ambient pressure and evaporates. It then flows to the second compressor connection 5 of the rotary piston compressor 1, which compresses the heat transfer medium 17, and the circuit described closes.

FIGS. 3 to 6 illustrate the operating principle of the rotary piston compressor 1, in which the fluid heat transfer medium 17 is drawn in at a low pressure and compressed to a higher pressure and thereby heated. Compression takes place by means of a rotating rotor 19, also referred to as a rotary piston. In this exemplary embodiment, the rotary piston compressor 1 is designed as a Wankel compressor. The Wankel compressor is a power-heating machine whose structure is similar to a Wankel engine.

The rotary piston compressor 1 comprises a housing 21, in the housing interior 23 of which the rotor 19 is eccentrically mounted. The movement of the rotor 19 corresponds to the rotary motion of an internal gear 27 in the rotor 19, which rolls around a stationary gear 25.

The rotor 19 has a profile in the form of an equilateral triangle with convex sides. The contour 29 of the double-arched housing interior 23 is an oval curve constricted around the short axis. The contour 29 is an epitrochoid. The rotating triangular rotor 19 is always in contact with the contour 29, such that three chambers 31, 33, 35 are defined, whose volume and position change with rotation of the rotor 19.

This exemplary embodiment of the rotary piston compressor 1 also has a third compressor connection 37 and a fourth compressor connection 39. Valves 41, 43, 45, 47, designed as check valves, are provided in each of the compressor connections 3, 5, 37, 39.

Figure 3:
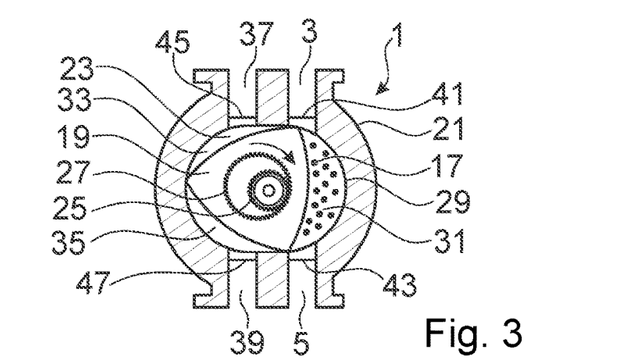
FIGS. 3 to 6 schematically show an exemplary embodiment of a rotary piston compressor having different rotor positions.
Figure 4:
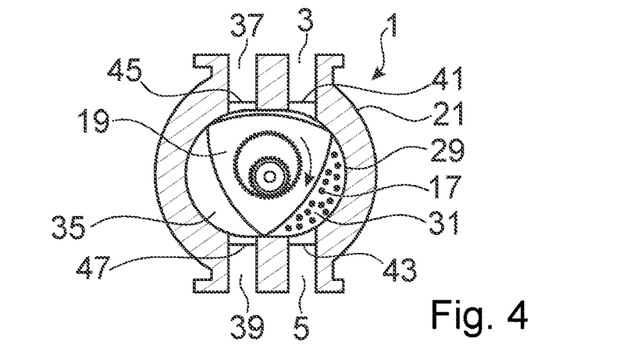
Figure 5:
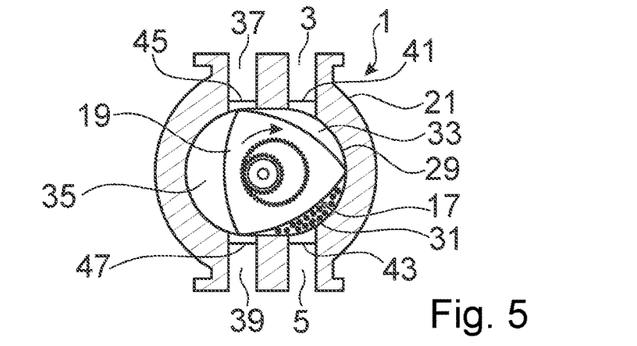
Figure 6:
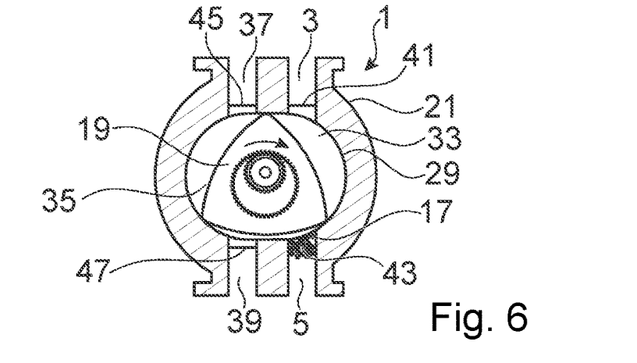

FIG. 3 illustrates the start of the compression process in the first operating condition, when the heat transfer medium 17 flows into one of the chambers 31 defined by the housing 21 and the rotor 19 via the first compressor connection 3. With increasing rotation of the rotor 19—clockwise in this exemplary embodiment—the rotor 19 moves in front of the first compressor connection 3, closes it and reduces the volume of the chamber 31. FIGS. 4 and 5 illustrate the decreasing chamber volume as the rotation of the rotor 19 increases. In FIG. 6, the chamber 31 is almost completely compressed and the compressed heat transfer medium 17 is forced out at the second compressor connection 5. This process is repeated with further rotation of the rotor 19 for the next chamber 33 and the following chamber 35.

Due to the symmetry of the rotary piston compressor 1, reversing the direction of rotation in the second operating state causes the heat transfer medium 17 drawn in at the second compressor connection 5 to be emitted at the first compressor connection 3 at a higher pressure and higher temperature. In this case, the heat transfer medium 17 flows into the chamber via the second compressor connection 5, is compressed and heated there by the reduction in volume of the chamber caused by the rotation of the rotor 19, and is then forced out again at the first compressor connection 3.

By rotating the rotor 19 in both directions, the system for temperature conditioning having a rotary piston compressor 1, as described in connection with FIGS. 1 and 2, can cool and heat. In other words, the system can be operated as a refrigerating machine or a heating machine. The operating state is changed by switching the direction of rotation of the rotary piston compressor 1.

The Wankel compressor shown in FIGS. 3 to 6 enables a second functionality in addition to the compression described above: it can simultaneously be used as a pressure reducer 7.

FIG. 6 shows a state in which the rotor 19 initially blocks the fourth compressor connection 39. With increasing clockwise rotation, as illustrated in FIGS. 3 and 4, the volume of the chamber 35 adjacent to the fourth compressor connection 39 is increased. This effect increases with further rotation until the rotor 19 in the chamber 35 releases the third compressor connection 37, as illustrated in FIG. 5. The expanded and thus cooled heat transfer medium 17 can flow out via the third compressor connection 37. By enlarging the chamber 35, the heat transfer medium 17 therein can expand and its pressure is reduced. In other words, the enlarging chamber 17 causes a reduction in pressure and consequently a cooling in the heat transfer medium 17, which is further pushed from the fourth to the third compressor connection 39, 37 by the rotation of the rotor 19. Above described operation can be supported by the valves 43, 45, 47, 49, for example, to stop further inflow into the chamber 35 during expansion. The valves 43, 45, 47, 49 can be controlled electronically.

Above described expansion also operates in a corresponding manner when the rotor 19 rotates in the opposite direction, such that the heat transfer medium 17 flows from the third to the fourth compressor connection 37, 39, thereby expanding. Here, too, the enlarging chamber causes a pressure reduction and, consequently, a cooling of the heat transfer medium 17.

Figure 7:
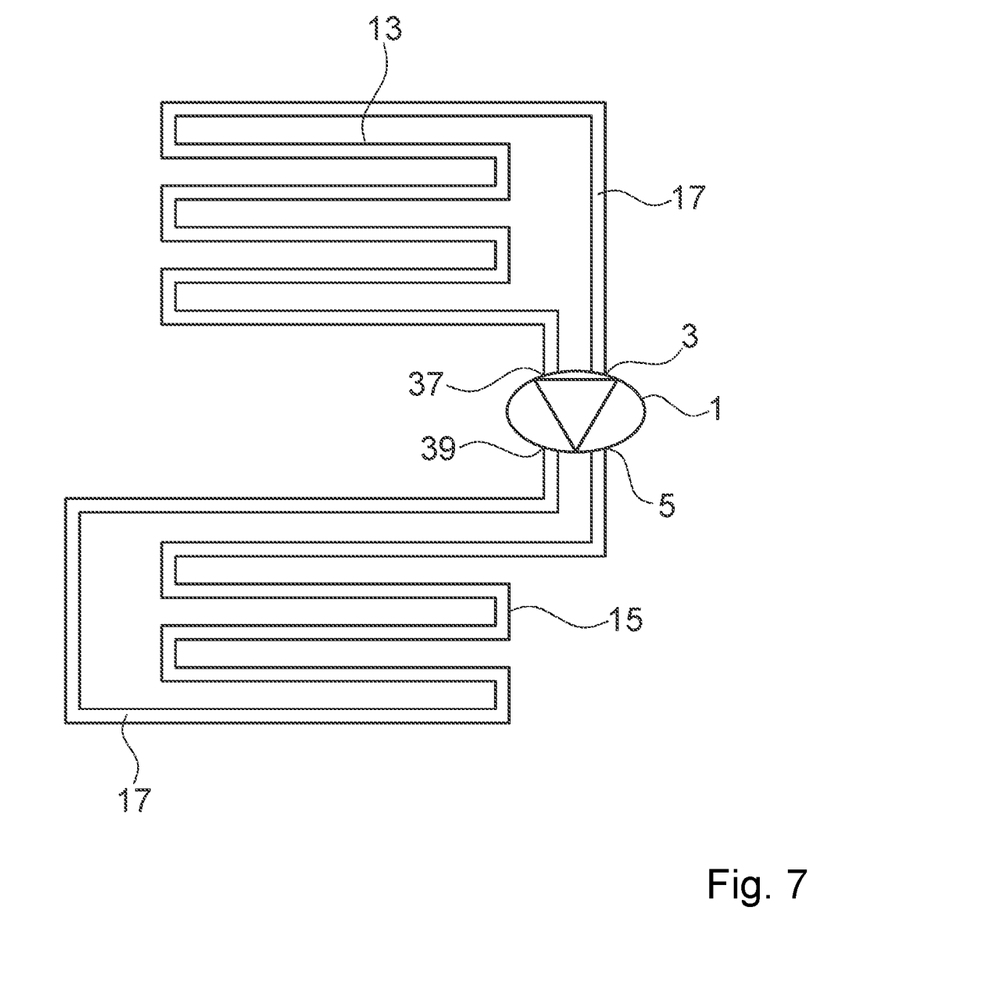
FIG. 7 schematically shows a further exemplary embodiment of a system for temperature conditioning.

FIG. 7 schematically shows an exemplary embodiment of a system for temperature conditioning in which the rotary piston compressor 1 is used both for compression and pressure reduction. In other words, the rotary piston compressor 1 also comprises the pressure reducer 7. The operation of the system for temperature conditioning during heating and cooling of the passenger compartment corresponds to the operation in the two operating states already described in connection with FIGS. 1 and 2.

However, the bidirectional pressure reducer designed as a separate component is absent, since its function is taken over by the rotary piston compressor 1, as has already been described in connection with FIGS. 3 to 6. The first heat exchanger 13 is coupled between the first and third compressor connections 3, 37. The second heat exchanger 15 is coupled between the second and fourth compressor connections 5, 39. The third and fourth compressor connections 37, 39 correspond to the first or second pressure reducing connections 9, 11.

It should be noted that exemplary embodiments of the rotary piston compressor 1 are not limited to the Wankel compressor described in FIGS. 3 to 6. Further exemplary embodiments for rotor profiles which are determined by a trochoid, in particular an epitrochoid, and their corresponding housing contours 29 are shown in FIGS. 8 and 9.

Figure 8:
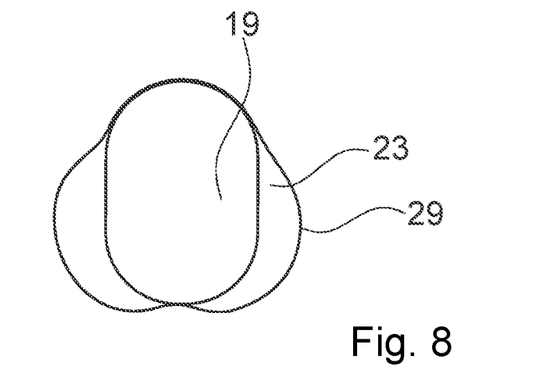
FIGS. 8 and 9 show rotor profiles and contours of housing interiors of further exemplary embodiments of rotary piston compressors.
Figure 9:
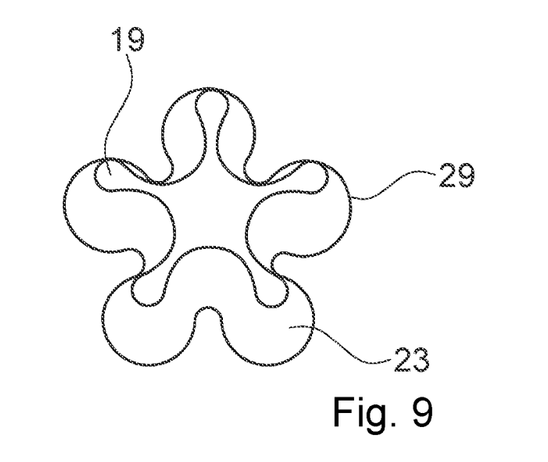

FIG. 8 shows an oval rotor profile and a contour 29 of a three-armed housing 21. FIG. 9 shows a star-shaped rotor profile having five arms and a contour 29 of a five-armed housing 21. These exemplary embodiments illustrate that the rotary piston compressor 1 can have a wide range of shapes of rotor profiles and housing contours 29 for compression and optionally also for expansion.

Figure 10:
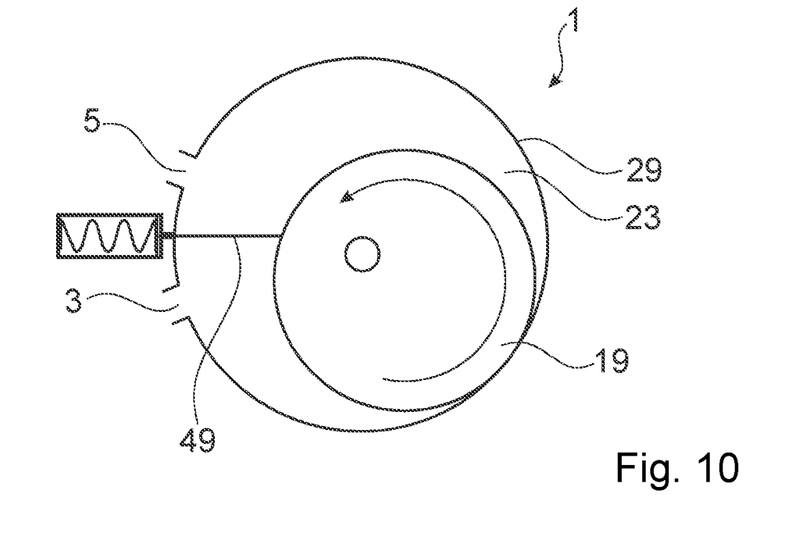
FIG. 10 schematically shows a further exemplary embodiment of a rotary piston compressor.

FIG. 10 schematically shows another exemplary embodiment of a rotary piston compressor 1.

The rotary piston compressor 1 has a first and second compressor connection 3, 5. A rotor 19 having a circular profile is eccentrically rotatably mounted in a housing with a circular contour 29 of the housing interior 23. Furthermore, a spring-mounted separating slide 49 is provided, which is always pressed against the rotor 19 to form two chambers in the housing interior 23. A fluid flows into the housing interior 23 through a connection 3. By means of its rotation, the rotor 19 forces the compressed fluid to the connection 5 on the outlet side. The separating slide 49 always seals off the suction side from the discharge side. This rotary piston compressor 1 can also be operated in two operating states depending on the direction of rotation of the rotor 19.

Figure 11:
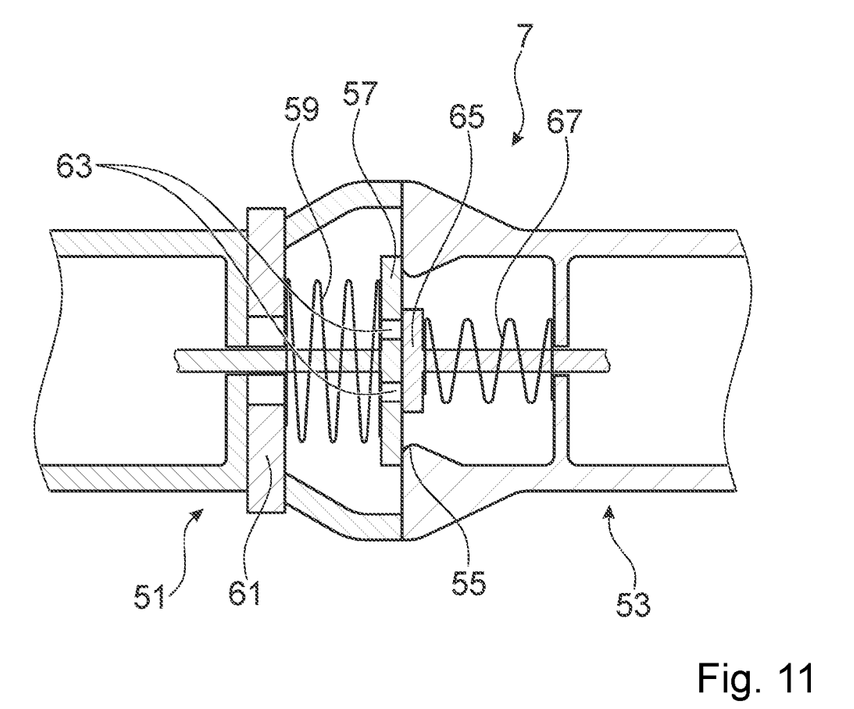
FIG. 11 schematically shows an exemplary embodiment of a pressure reducer.

FIG. 11 shows an exemplary embodiment of a bidirectional pressure reducer 7 designed as a bidirectional expansion valve.

The expansion valve has a first tubular region 51, on the left-hand side in FIG. 11, and a second tubular region 53, on the right-hand side in FIG. 11. The regions 51, 53 are mechanically fixed at the end faces. The cross-section of the second region 53 is reduced at its end face facing the first region 51 by an inwardly projecting projection 55.

A first closing plate 57 in the first region has holes 63. The first closing plate 57 is pressed against the projection 55 serving as a stop by a spring 59, the first spring force of which acts in the direction of the second region 53. The first spring force can be adjusted by an optional bimetal 61, which further pretensions the first spring 49. A second closing plate 65 is pressed onto the holes 63 of the first closing plate 57 by a second spring 67, the second spring force of which acts in the direction of the first region 51 in the opposite direction of the first spring force. The diameter of the second closing plate 65 is smaller than that of the projection 55, but such that the second closing plate 65 spans the holes 63. The second spring force is less than the first spring force. In a rest state, the first closing plate 57 closes the projection 55. The second closing plate 65 closes the holes 63 in the first closing plate 57, but without pushing the first closing plate 57 away from the projection 55.

At a pressure in the first region greater than a first limit, e.g. 3 bar, the second closing plate 65 opens by being pushed against the second spring force and releases the flow through the holes 63 in the first closing plate 57. They have a throttling effect and cause the fluid flowing through them to expand. At a pressure in the second region 53 greater than a second limit, e.g. 15 bar, the first closing plate 57 opens by being pushed against the second first spring force, and releases the flow. The reduction in cross-section caused by the projection 55 has a throttling effect and causes the fluid flowing through to expand.

Instead of the above-described exemplary embodiment of an expansion valve, an expansion valve of a different design, whether mechanical or electronic, can also be used.

The above-mentioned features and the features indicated in the claims, as well as those which can be taken from the figures, can be advantageously implemented both individually and in various combinations. The invention is not limited to the described exemplary embodiments, but can be modified in various ways within the scope of the expertise of a person skilled in the art.

REFERENCE NUMERALS

1 rotary piston compressor
3 first compressor connection
5 second compressor connection
7 pressure reducer
9 first pressure reducer connection
11 second pressure reducer connection
13 first heat exchanger
15 second heat exchanger
17 heat transfer medium
19 rotor
21 housing
23 housing interior
25 gear
27 internal gear
29 contour
31 chamber
33 chamber
35 chamber
37 third compressor connection
39 fourth compressor connection
41 valve
43 valve
45 valve
47 valve
49 separating slide
51 first region
53 second region
55 projection
57 first closing plate
59 first spring
61 bimetal
63 hole
65 second closing plate
67 second spring

The invention claimed is:

1. A system comprising:
a rotary piston compressor (1) for temperature conditioning, the rotary piston compressor having,
a rotor (19) mounted in a housing (21),
wherein the rotary piston compressor (1) is designed in such a way that the rotor (19) rotates in a first direction in a first operating state and rotates in a second direction opposite to the first direction in a second operating state,
and wherein, in the first operating state, a first compressor connection (3) is designed to supply a heat transfer medium (17), and a second compressor connection (5) is designed to discharge the compressed heat transfer medium (17),
and wherein, in the second operating state, the second compressor connection (5) is designed to supply the heat transfer medium (17), and the first compressor connection (3) is designed to discharge the compressed heat transfer medium (17);
and pressure reducer (7, 1) having a first pressure reducer connection (9, 37) and a second pressure reducer connection (11, 39), wherein the pressure reducer (7, 1) is designed to reduce a pressure of the heat transfer medium (17) flowing through it and to cause it to expand, and a first heat exchanger (13) coupled between the first compressor connection (3) and the first pressure reducer connection (9, 37);

and a second heat exchanger (15) coupled between the second compressor connection (5) and the second pressure reducer connection (11, 39);

wherein the system can be operated as a heat machine and as a refrigeration machine;

wherein the direction of flow of the heat transfer medium (17) through the system can be changed by switching the direction of rotation of the rotor (19);

wherein the rotary piston compressor (1) has a third compressor connection (37) and a fourth compressor connection (39), wherein, in the first operating state, the fourth compressor connection (39) is designed to supply the heat transfer medium (17), and the third compressor connection (37) is designed to discharge the expanded heat transfer medium (17), and wherein, in the second operating state, the third compressor connection (37) is designed to supply the heat transfer medium (17), and the fourth compressor connection (39) is designed to discharge the expanded heat transfer medium (17).

2. The system according to claim 1, which is designed in such a way that, in the first operating state, the first heat exchanger (13) is operated as an evaporator and the second heat exchanger (15) is operated as a condenser, and in the second operating state, the first heat exchanger (13) is operated as a condenser and the second heat exchanger (15) is operated as an evaporator.

3. The system according to claim 1, wherein the pressure reducer (7, 1) is designed to reduce the pressure of the heat transfer medium (17) flowing from the first to the second pressure reducer connection (9, 37; 11, 39) and to cause its expansion, and to reduce the pressure of the heat transfer medium (17) flowing from the second to the first pressure reducer connection (11, 39; 9, 37) and to cause its expansion.

4. The system according to claim 1, wherein the pressure reducer (7) is designed as an expansion valve.

5. The system according to The system according to wherein the pressure reducer is comprised by the rotary piston compressor (1) for the system for temperature conditioning having the rotor (19) mounted in the housing (21), and wherein the first pressure reducer connection (9) is the third compressor connection (37) and the second pressure reducer connection (11) is the fourth compressor connection (39).

6. The system as set forth in claim 1, wherein the rotary piston compressor (1) is designed in such a way that, in the first operating state, with rotation of the rotor (19), a chamber (31, 33, 35) defined by the housing (21) and the rotor (19) and adjacent to the first compressor connection (3) is deformed with rotation of the rotor (19) in such a way that its volume is reduced and it is adjacent to the second compressor connection (5), and in that in the second operating state, with rotation of the rotor (19), the chamber (31, 33, 35) defined by the housing (21) and the rotor (19) and adjacent to the second compressor connection (5), is deformed with rotation of the rotor (19) in such a way that its volume is reduced and it is adjacent to the first compressor connection (3).

7. The system as set forth in claim 1, wherein a profile of the rotor (19) is determined by a trochoid, in particular an epitrochoid, and a housing interior (23) has a contour (29) which corresponds to an outer envelope of the trochoid.

8. The system as set forth in claim 1, wherein the rotary piston compressor (1) is designed as a Wankel compressor, in which the rotor (19) has an arcuate-triangular profile.

9. The system as set forth in claim 1, in which a valve (41, 43) is provided at the first compressor connection (3) and/or at the second compressor connection (5).

10. The system as set forth in claim 1, wherein the rotary piston compressor (1) is designed in such a way that, in the first operating state, with rotation of the rotor (19), a further chamber (31, 33, 35) defined by the housing (21) and the rotor (19) and adjacent to the fourth compressor connection (39) is deformed with rotation of the rotor (19) in such a way that its volume increases and it is adjacent to the third compressor connection (37), and that, in the second operating state, with rotation of the rotor (19), the further chamber (31, 33, 35) defined by the housing (21) and the rotor (19) and adjacent to the third compressor connection (37) is deformed with rotation of the rotor (19) in such a way that its volume increases and it is adjacent to the fourth compressor connection (39).

11. The system as set forth in claim 1, wherein a valve (45, 47) is provided at the third compressor connection (37) and/or at the fourth compressor connection (39).

12. A system comprising:
a rotary piston compressor (1) for temperature conditioning, the rotary piston compressor having,
  a rotor (19) mounted in a housing (21),
  wherein the rotary piston compressor (1) is designed in such a way that the rotor (19) rotates in a first direction in a first operating state and rotates in a second direction opposite to the first direction in a second operating state,
  and wherein, in the first operating state, a first compressor connection (3) is designed to supply a heat transfer medium (17), and a second compressor connection (5) is designed to discharge the compressed heat transfer medium (17),
  and wherein, in the second operating state, the second compressor connection (5) is designed to supply the heat transfer medium (17), and the first compressor connection (3) is designed to discharge the compressed heat transfer medium (17);
a pressure reducer (7, 1) having a first pressure reducer connection (9, 37) and a second pressure reducer connection (11, 39), wherein the pressure reducer (7, 1) is designed to reduce a pressure of the heat transfer medium (17) flowing through it and to cause it to expand, and a first heat exchanger (13) coupled between the first compressor connection (3) and the first pressure reducer connection (9, 37); and
a second heat exchanger (15) coupled between the second compressor connection (5) and the second pressure reducer connection (11, 39);

wherein use of the system for temperature conditioning is used in a vehicle, wherein the first heat exchanger (13) is positioned in such a way that it gives off heat to a passenger compartment or cools it, and wherein the second heat exchanger (15) is positioned in such a way that it gives off heat to the surroundings beyond the passenger compartment or receives heat from it;

wherein the rotary piston compressor (1) has a third compressor connection (37) and a fourth compressor connection (39), wherein, in the first operating state, the fourth compressor connection (39) is designed to supply the heat transfer medium (17), and the third compressor connection (37) is designed to discharge the expanded heat transfer medium (17), and wherein, in the second operating state, the third compressor connection (37) is designed to supply the heat transfer medium (17), and the fourth compressor connection (39) is designed to discharge the expanded heat transfer medium (17).

\* \* \* \* \*

UNITED STATES PATENT AND TRADEMARK OFFICE
CERTIFICATE OF CORRECTION

| | |
|---|---|
| PATENT NO. | : 11,841,019 B2 |
| APPLICATION NO. | : 17/196175 |
| DATED | : December 12, 2023 |
| INVENTOR(S) | : Frank Dahinten |

It is certified that error appears in the above-identified patent and that said Letters Patent is hereby corrected as shown below:

In the Claims

Claim 1, Column 10, Line 63: please delete "and pressure reducer" and replace with -- a pressure reducer --

Claim 5, Column 11, Line 46: please delete "The system according to The system according to" and replace with -- The system according to claim 1, --

Signed and Sealed this
Thirtieth Day of January, 2024

Katherine Kelly Vidal
*Director of the United States Patent and Trademark Office*